United States Patent
Jin et al.

(10) Patent No.: US 7,450,673 B2
(45) Date of Patent: Nov. 11, 2008

(54) SYSTEM AND METHOD FOR IMPROVING THE ROBUSTNESS OF SPATIAL DIVISION MULTIPLE ACCESS VIA NULLING

(75) Inventors: Hang Jin, Plano, TX (US); Li Guo, Irving, TX (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 11/695,575

(22) Filed: Apr. 2, 2007

(65) Prior Publication Data

US 2008/0039067 A1    Feb. 14, 2008

Related U.S. Application Data

(60) Provisional application No. 60/836,716, filed on Aug. 10, 2006.

(51) Int. Cl.
*H04L 1/02* (2006.01)
*H04B 7/08* (2006.01)

(52) U.S. Cl. .................. 375/347; 455/132
(58) Field of Classification Search ............ 375/316, 375/267, 347; 455/132
See application file for complete search history.

(56) References Cited

U.S. PATENT DOCUMENTS

| | | | | |
|---|---|---|---|---|
| 6,927,728 B2 * | 8/2005 | Vook et al. | | 342/377 |
| 7,068,977 B1 * | 6/2006 | Yang et al. | | 455/67.13 |
| 7,151,755 B2 * | 12/2006 | Xu | | 370/330 |
| 2006/0292990 A1 * | 12/2006 | Karabinis et al. | | 455/63.4 |
| 2008/0102898 A1 * | 5/2008 | Na et al. | | 455/562.1 |

* cited by examiner

*Primary Examiner*—Tesfaldet Bocure
(74) *Attorney, Agent, or Firm*—Edell, Shapiro & Finnan, LLC (57) ABSTRACT

The present invention discloses a base transceiver station (BTS) equipped with a plurality of antennas for improving the robustness of spatial division multiple access via nullng. The BTS comprises of a first matrix module receiving a plurality of signals from one or more customer premises equipments (CPEs) through the plurality of antennas and producing correspondingly a first plurality of covariance matrices representing the plurality of signals, a second matrix module receiving the first plurality of covariance matrices and generating correspondingly a set of derivative spatial signature matrices representing the CPEs respectively, a third matrix module receiving the derivative spatial signature matrices and producing correspondingly a second plurality of covariance matrices representing interferences of the CPEs, and an eigenvector module generating a plurality of beamforming vectors for the CPEs from the plurality of derivative spatial signature matrices and the second plurality of covariance matrices.

20 Claims, 5 Drawing Sheets

SYSTEM AND METHOD FOR IMPROVING THE ROBUSTNESS OF SPATIAL DIVISION MULTIPLE ACCESS VIA NULLING

CROSS REFERENCE

The present application claims the benefit of U.S. Provisional Application Ser. 60/836,716, which was filed on Aug. 10, 2006.

BACKGROUND

A communication channel in a wireless communication network can be shared by different wireless stations in the network. One example of channel sharing is that wireless stations, such as customer premises equipment (CPEs), transmit signals on the same frequency at different times or on different frequencies at the same time.

A wireless communication network that employs spatial division multiple access (SDMA) utilizes spatial diversity to increase the capacity of a network. In such a system, the CPEs sharing the same communication channel transmit signals on the same frequency at the same time.

In order to prevent the signals transmitted by the CPEs on the same frequency at the same time from interfering with one another, a base transceiver station (BTS) needs to isolate the signals in such a way that they will not reach unintended wireless stations. In other words, these CPEs must be able to reliably detect and retrieve the signals that are sent to them.

There are two common methods to provide isolation among the CPEs sharing the same communication channel in a wireless communication network that employs SDMA. They are polarization isolation and spatial isolation. Polarization isolation is a more technically challenging method, and yet, it only provides a limited degree of isolation among the CPEs. In an environment with severe multi-path, polarization isolation only provides a difference of 5 to 10 dB in gain between the signals and interference.

An antenna array system on a BTS in a wireless communication network provides a practical solution for spatial isolation. The BTS selects a set of CPEs to participate in SDMA such that the degree of isolation among them is greater than a predetermined threshold. Spatial isolation among CPEs is achieved by using beamforming and interference nulling for antenna arrays.

For example, in a system employing SDMA, the BTS determines the spatial signatures of CPEs A and B, which are identified as candidates for sharing a communication channel, and generates a different beamforming weighting vector for CPEs A and B by using their spatial signatures jointly.

When the BTS transmits a signal to CPE A, the beamforming weighting vector of CPE A is applied to the antenna array. The antenna beam pattern created with the beamforming weighting vector has a nulling angle positioned toward the direction of arrival (DOA) of the antennae beam pattern of CPE B, i.e., CPE A will not receive signals intended for CPE B. The same mechanism is also applied to CPE B. The method described above is called SDMA via nulling.

One issue related to an SDMA via nulling method is that the effectiveness of antenna nulling is very sensitive to the accuracy of the beamforming weighting vector generated from the spatial signatures. If the beamforming weighting vector is not accurate enough, employing an SDMA operation might not lead to an improvement in system capacity. It might even make the channel unusable for the CPEs sharing the same channel, which subsequently reduces the overall capacity of the wireless communication network.

For example, in order to support 16 QAM modulation in a wireless network employing SDMA, each CPE must have an SINR greater than 20 dB. Assume that CPEs A and B both have an SINR greater than 20 dB and both support 16 QAM modulation before sharing a communication channel. If the wireless communication network employing SDMA via nulling cannot provide an SINR greater than 20 dB for both CPEs A and B, employing SDMA will bring down the communication channel for both of them.

SDMA via nulling eliminates co-channel interference (CCI) by applying beamforming weighting vectors of the CPEs that are almost orthogonal to each other. The effectiveness of the elimination of the CCI by employing SDMA via nulling depends on the accuracy of the spatial signatures of a CPE.

However, in reality, the spatial signatures calculated from receiving signals are never ideal; therefore, it is not uncommon for a CCI leakage to occur in the wireless communication network employing SDMA via nulling. A CCI leakage produces a fixed noise level and puts a hard limit on the bit error rate (BER) of the wireless communication network. As such, what is desired is a system and method for providing a robust SDMA via nulling.

SUMMARY

The present invention discloses a base transceiver station (BTS) equipped with a plurality of antennas for improving the robustness of spatial division multiple access via nulling. The BTS comprises of a first matrix module receiving a plurality of signals from one or more customer premises equipments (CPEs) through the plurality of antennas and producing correspondingly a first plurality of covariance matrices representing the plurality of signals, a second matrix module receiving the first plurality of covariance matrices and generating correspondingly a set of derivative spatial signature matrices representing the CPEs respectively, a third matrix module receiving the derivative spatial signature matrices and producing correspondingly a second plurality of covariance matrices representing interferences of the CPEs, and an eigenvector module generating a plurality of beamforming vectors for the CPEs from the plurality of derivative spatial signature matrices and the second plurality of covariance matrices.

The construction and method of operation of the invention, however, together with additional objects and advantages thereof, will be best understood from the following description of specific embodiments when read in connection with the accompanying drawings.

BRIEF DESCRIPTION OF THE DRAWINGS

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a system and method that improves the robustness of spatial division multiple access (SDMA) via nulling. The method disclosed in the present invention uses novel sets of the spatial signatures of customer premises equipments to generate beamforming weighting vectors for the CPEs to share a communication channel.

Rather than using the spatial signatures calculated from the receiving signals of a CPE to generate a beamforming weighting vector, the method disclosed in the present invention calculates derivative spatial signature matrices of a CPE and subsequently produces a covariance matrix of interference. A beamforming weighting vector is generated by using the derivative spatial signature matrices and the covariance matrix of interference of the CPEs sharing the same communication channel.

By applying a beamforming weighting vector generated by the aforementioned method to an antenna array on a base transceiver station, the antenna beam pattern of a CPE has a wider nulling angle positioned toward the direction of co-channel interference. The wider nulling angle makes an SDMA via nulling method more robust, because a small error in a covariance matrix of interference has less effect on the efficiency of the method.

Figure 1A:
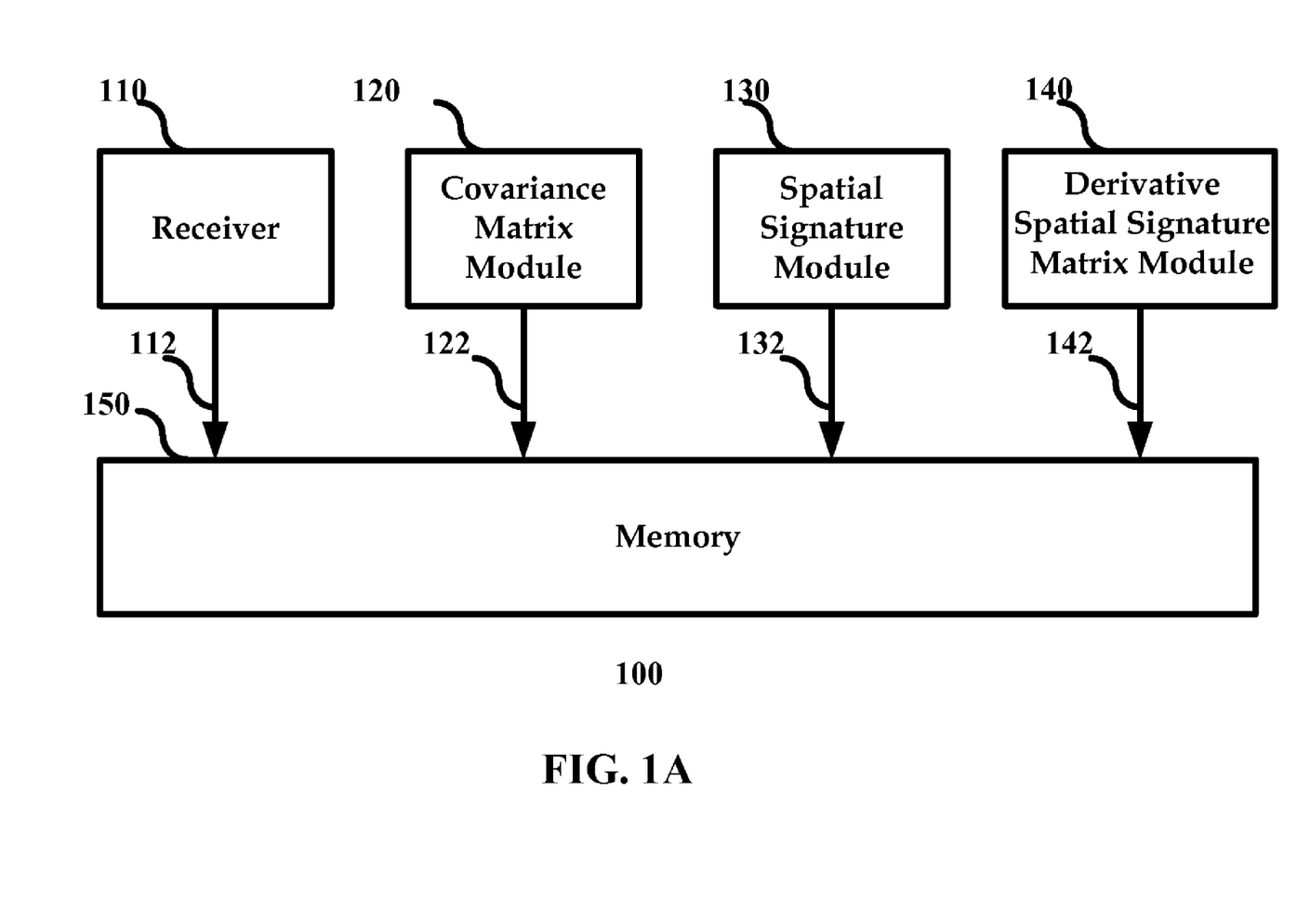
FIG. 1A is a block diagram illustrating the first part of a system that calculates derivative spatial signature matrices for each CPE.
Figure 1B:
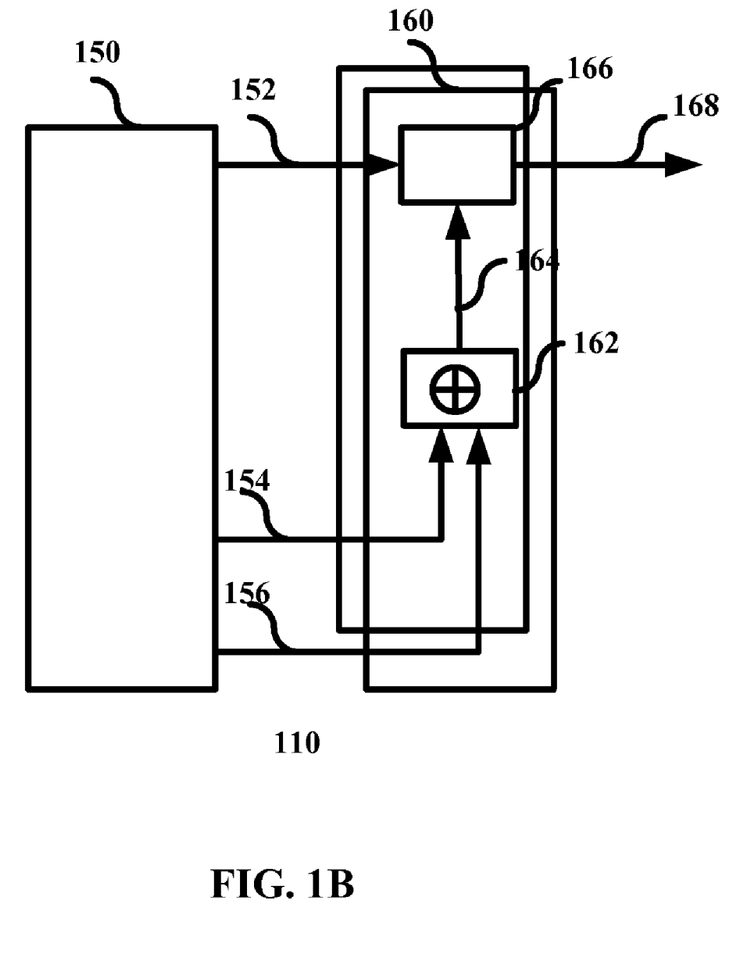
FIG. 1B is a block diagram illustrating the second part of the system that generates beamforming weighting vectors for the CPEs sharing a communication channel.

FIGS. 1A and 1B illustrate a system that generates beamforming weighting vectors for the CPEs sharing a communication channel in a wireless communication network employing SDAM via nulling. FIG. 1A is a block diagram illustrating the first part of the system that calculates derivative spatial signature matrices for each CPE. FIG. 1B is a block diagram illustrating the second part of the system that generates beamforming weighting vectors for the CPEs sharing the communication channel.

FIG. 1A shows five modules: a receiver module 110, a covariance matrix module 120, a spatial signature module 130, a derivative spatial signature matrix module 140, and a memory module 150. Assume that there are L CPEs sharing a communication channel.

The m antennas on a BTS receives a signal transmitted from CPE k at a receiving period i, and the BTS forms a vector of receiving signals $$Y_i^k = \begin{bmatrix} y_{i1}^k \\ y_{i2}^k \\ \vdots \\ y_{im}^k \end{bmatrix} 112,$$

where k∈{1, . . . ,L} and $y_{ij}^k$ is the receiving signals received by antenna j at a receiving period i, where j∈{1, . . . ,M}. The vector 112 is stored in the memory module 150. The receiver module 110 receives signals continuously and all the receiving vectors 112 are stored in the memory module 150.

The covariance module 120 takes a set of $N^k$ receiving vectors 112 of CPE k from the memory module 150 and produces a covariance matrix of receiving signals 122 according to the following equation:

$$COV^k = \frac{1}{N^k} \sum_{i=1}^{N^k} \begin{bmatrix} y_{i1}^k \\ y_{i2}^k \\ \vdots \\ y_{im}^k \end{bmatrix} [y_{i1}^{k*} \ y_{i2}^{k*} \ \cdots \ y_{im}^{k*}],$$

where $(y_{im}^k)^*$ is the conjugate-transpose of $y_{im}^k$. The covariance matrix of receiving signals $COV^k$ 122 is stored in the memory module 150. The covariance matrix module produces a covariance matrix of receiving signals continuously and all the covariance matrices 122 are stored in the memory module 150.

The spatial signature module 130 calculates a spatial signature 132 of CPE k by using the covariance matrix of receiving signals 122. The spatial signatures 132 are stored in the memory module 150. The spatial signature module calculates spatial signatures continuously and all spatial signatures are stored in the memory module 150.

The derivative spatial signature matrix module 140 calculates a set of $s^k$ derivative spatial signature matrices 142 of CPE k from a set of spatial signatures 132 calculated by the spatial signature module 130. The set of derivative spatial signature matrices 142, denoted as $\{R_1^k, \ldots, R_{s^k}^k\}$, is stored in the memory module 150.

The BTS uses the system described in FIG. 1A to calculate a set of derivative spatial signature matrices of every CPE while the system described in FIG. 1B uses the derivative spatial signature matrices of all L CPEs to generate the beamforming weighting vectors of all L CPEs sharing a communication channel in a wireless communication network employing SDMA via nulling.

FIG. 1B shows a beamforming weighting vector module 160, which is composed of two modules: an interference covariance module 162 and an eigenvector module 166. The beamforming weighting vector module 160 generates the beamforming weighting vector of CPE k by using the derivative spatial signature matrices of a set of L CPEs.

The interference covariance module 162 produces a covariance matrix of interference 164 of CPE k by using the derivative spatial signature matrices of all L CPEs, excluding CPE k, according to the following equation:

$$\sum_{j=1, j \neq k}^{L} \left( \frac{1}{s^j} \sum_{i=1}^{s^j} R_i^j R_i^{j^H} \right),$$

where $R_i^{j^H}$ is the conjugate-transpose of $R_i^j$. Lines 154 and 156 depict two of the derivative spatial signature matrices of CPEs, excluding CPE k, while a line 152 depicts the derivative spatial signature matrix of CPE k. These derivative spatial signature matrices are retrieved from the memory module 150.

Based on the covariance matrix of interference 164 and the derivative spatial signature matrices 152, the eigenvector module 166 generates a beamforming weighting vector $W^k$ 168 from the following eigenvalue equation:

$$\left(\sum_{j=1, j \neq k}^{L}\left(\frac{1}{s^j}\sum_{i=1}^{s^j} R_i^j R_i^{jH}\right) + \sigma_n^2 I\right)^{-1}\left(\sum_{i=1}^{s^k} R_i^k R_i^{kH}\right).$$

$W^k$ is the eigenvector corresponding to the largest eigenvalue of the equation.

The method to obtain beamforming weighting vectors in a wireless communication network employing the SDMA via nulling is applicable to other wireless communication networks that support multiple access, such as frequency division multiple access (FDMA), time division multiple access (TDMA), code division multiple access (CDMA), orthogonal frequency division multiplex multiple access (OFDM-MA) and any combinations of the above. In addition, frequency division duplex (FDD) and time division duplex (TDD) also allow multiple access in a wireless communication network.

Figure 2A:
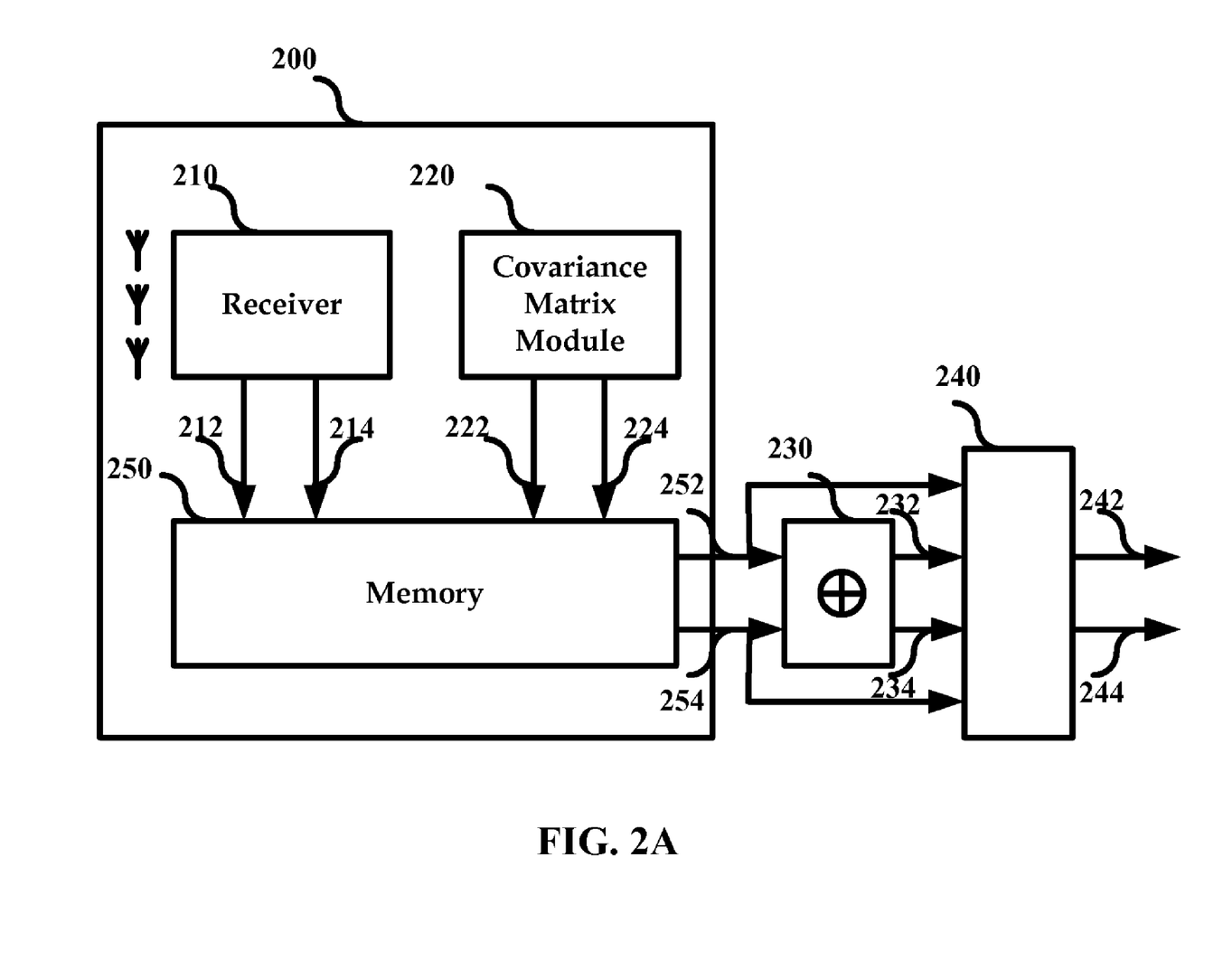
FIGS. 2A and 2B show two applications of the system and method disclosed in the present invention.
Figure 2B:
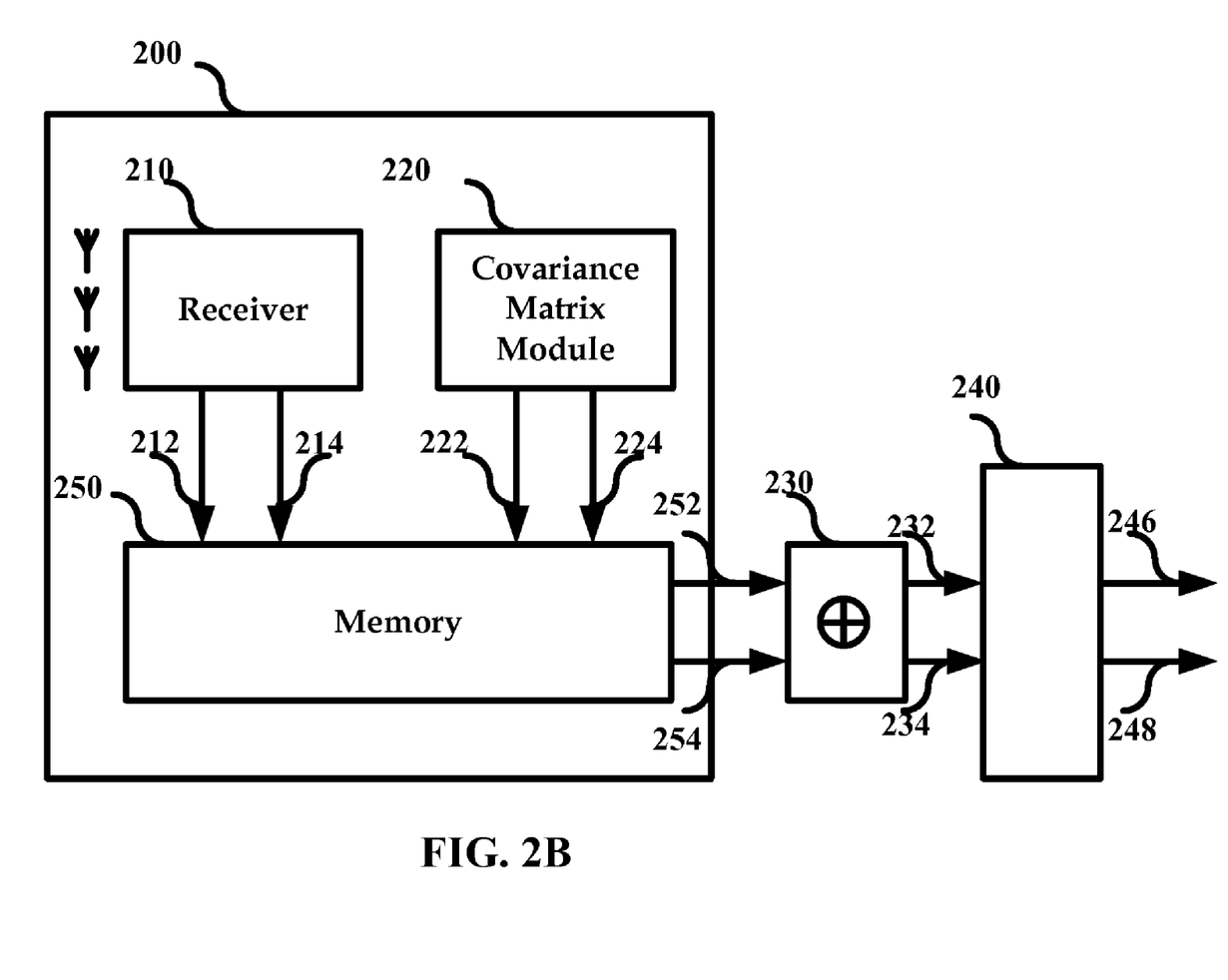

FIGS. 2A and 2B depict a system module 200 that calculates derivative spatial signature matrices of a CPE, an interference covariance module 230, and an eigenvector module 240. The system module 200 includes a receiver module 210 of a BTS in an OFDMA-based WiMax system, a covariance matrix module 220, and a memory module 250.

FIGS. 2A and 2B show two applications of the system and method disclosed in the present invention in an OFDMA-based WiMax system with TDD employing SDMA via nulling. Assume CPEs A and B share one communication channel in a wireless communication network employing SDMA via nulling. In an OFDM system, a receiving signal is denoted as a unit of symbols.

In FIG. 2A, the m antennas on the BTS receive OFDM symbols transmitted from CPE A at a receiving period i, and the BTS forms a vector of receiving signals 212, denoted as $$Y_i^A = \begin{bmatrix} y_{i1}^A \\ y_{i2}^A \\ \vdots \\ y_{im}^A \end{bmatrix},$$

where the receiving symbols received by an antenna k are shown as $y_{ik}^A$, where $k \in \{1, \ldots, m\}$. The vector 212 is stored in the memory module 250. The receiver module 210 receives OFDM symbols from CPE A continuously and all receiving vectors 212 are stored in the memory module 250.

The same operation is also applied to CPE B. A vector of receiving OFDM symbols 214 at time j, is denoted as $$Y_j^B = \begin{bmatrix} y_{j1}^B \\ y_{j2}^B \\ \vdots \\ y_{jm}^B \end{bmatrix},$$

where the receiving symbols received by antenna j are shown as $y_{jk}^B$, where $k \in \{1, \ldots, m\}$. The receiver module 210 receives OFDM symbols from CPE B continuously and all receiving vectors 214 are stored in the memory module 250.

The covariance matrix module 220 takes a set of $N^A$ receiving vectors 212 of CPE A from the memory module 250 and produces a covariance matrix of receiving signals of CPE A according to the following equation:

$$COV^A = \frac{1}{N^A}\sum_{i=1}^{N^A}\begin{bmatrix} y_{i1}^A \\ y_{i2}^A \\ \vdots \\ y_{im}^A \end{bmatrix}[y_{i1}^{A*} \ y_{i2}^{A*} \ \cdots \ y_{im}^{A*}],$$

where $(y_{im}^A)^*$ is the conjugate-transpose of $(y_{im}^A)$. The covariance matrix of receiving signals $COV^A$ 222 is stored in the memory module 250. The covariance matrix module 220 produces a covariance matrix of receiving signals of CPE A continuously, and all the covariance matrices of receiving signals 222 are stored in the memory module 250.

The same operation is also applied to CPE B. A covariance matrix of receiving signals of CPE B is produced according to the following equation:

$$COV^B = \frac{1}{N^B}\sum_{i=1}^{N^B}\begin{bmatrix} y_{i1}^B \\ y_{i2}^B \\ \vdots \\ y_{im}^B \end{bmatrix}[y_{i1}^{B*} \ y_{i2}^{B*} \ \cdots \ y_{im}^{B*}],$$

where $(y_{im}^B)^*$ is the conjugate-transpose of $(y_{im}^B)$ $COV^B$ 224 is stored in the memory module 250. The covariance matrix module 220 produces a covariance matrix of receiving signals of CPE B continuously, and all the covariance matrices of receiving signals 224 are stored in the memory module 250. The memory module 250 has a set of m+1 covariance matrices of receiving signals 252 of CPE A, denoted as $\{COV_1^A, COV_2^A, \ldots, COV_m^A, COV^A\}$, and a set of m+1 covariance matrices of receiving signals 254 of CPE B, denoted as $\{COV_1^B, COV_2^B, \ldots, COV_m^B, COV^B\}$.

Using the covariance matrices of receiving signals 254 of CPE B, the interference covariance module 230 produces a covariance matrix of interference 232 of CPE A according to the following equation:

$$\sum_{i=1}^{m} Cov_i^B + Cov^B.$$

Similarly, the interference covariance module 230 uses the covariance matrices of receiving signals 252 of CPE A to produce a covariance matrix of interference 234 of CPE B according to the following equation:

$$\sum_{i=1}^{m} Cov_i^A + Cov^A.$$

Using the covariance matrix of interference 232 and the last covariance matrix of receiving signals $COV^A$ in 252 of CPE A, the eigenvector module 240 generates a beamforming weighting vector 242 of CPE A, denoted as $W^A$, using the following eigenvalue matrix:

$$\left[\frac{1}{m+1}\left(\sum_{i=1}^{m}Cov_i^B+Cov^B\right)+\sigma_n^2 I\right]^{-1}(Cov^A).$$

$W^A$ is the eigenvector corresponding to the largest eigenvalue of the matrix.

Similarly, using the covariance matrix of interference 234 and the last covariance matrix of receiving signals $COV^B$ in 254 of CPE B, the eigenvector module 240 generates a beamforming weighting vector 244 of CPE B, denoted as $W^B$, using the following eigenvalue matrix:

$$\left[\frac{1}{m+1}\left(\sum_{i=1}^{m}Cov_i^A+Cov^A\right)+\sigma_n^2 I\right]^{-1}(Cov^B).$$

$W^B$ is the eigenvector corresponding to the largest eigenvalue of the matrix.

FIGS. 2A and 2B use the same system module 200. The difference between FIG. 2A and FIG. 2B is that in FIG. 2B the eigenvector module 240 generates the beamforming weighting vectors of CPE A and B by using the covariance matrices of interference 232 and 234.

A beamforming weighting vector 246 of CPE A, denoted as $W^A$, is generated using the following eigenvalue matrix:

$$\left[\frac{1}{m+1}\left(\sum_{i=1}^{m}Cov_i^B+Cov^B\right)+\sigma_n^2 I\right]^{-1}\left(\sum_{i=1}^{m}Cov_i^A+Cov^A\right).$$

$W^A$ is the eigenvector corresponding to the largest eigenvalue of the matrix. Similarly, a beamforming weighting vector 248 of CPE B, denoted as $W^B$, is generated using the following eigenvalue matrix:

$$\left[\frac{1}{m+1}\left(\sum_{i=1}^{m}Cov_i^B+Cov^B\right)+\sigma_n^2 I\right]^{-1}\left(\sum_{i=1}^{m}Cov_i^B+Cov^B\right).$$

$W^B$ is the eigenvector corresponding to the largest eigenvalue of the matrix.

Figure 3:
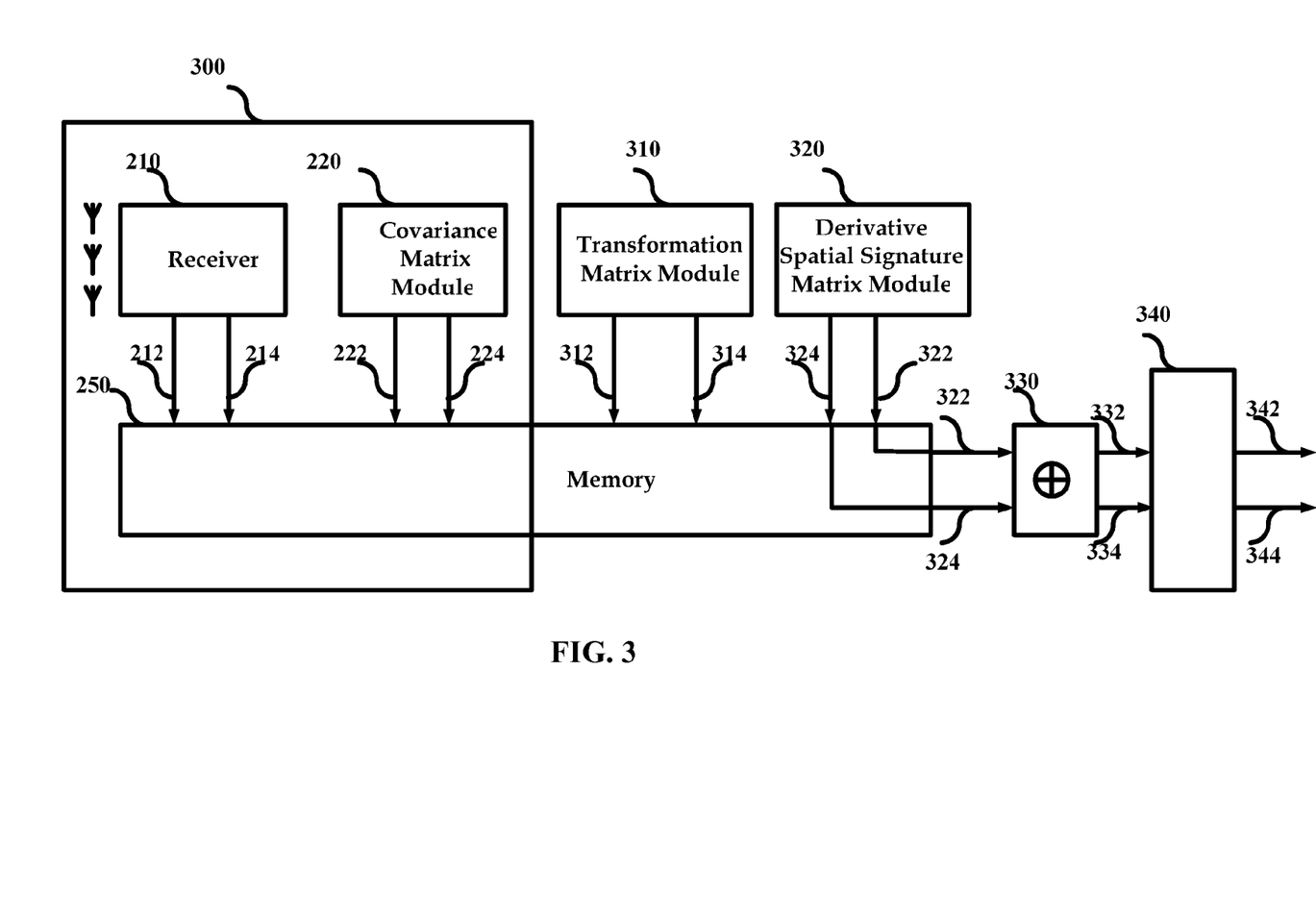
FIG. 3 is another application of the system and method disclosed in the present invention.

FIG. 3 is another application of the system and method disclosed in the present invention in an OFDMA-based WiMax system with TDD employing SDMA via nulling. FIG. 3 depicts a system 300, which is the same as the system 200 in FIG. 2A, a transformation matrix module 310, a derivative spatial signature matrix module 320, an interference covariance matrix module 330, and an eigenvector module 340.

The memory module 250 in the system 300 has a set of m+1 covariance matrices of receiving signals $\{COV_1^A, COV_2^A, \ldots, COV_m^A, COV^A\}$ for CPE A and a set of m+1 covariance matrices of receiving signals $\{COV_1^B, COV_2^B, \ldots, COV_m^B, COV^B\}$ for CPE B.

Using the m+1 covariance matrices of receiving signals of CPE A, the transformation matrix module 310 produces m transformation matrices 312 for CPE A, denoted as $T^A$, based on the following equations:

$T_i^A = COV_{i+1}^A (COV_i^A)^{-1}$, where $i \in \{1, \ldots, m-1\}$, and $T_m^A = COV^A (COV_m^A)^{-1}$.

If $(COV_m^A)^{-1}$ does not exist, the m-th transformation matrix $T_m^A$ is produced based on the following equation:

$T_m^A = COV_{m+1}^A (COV_m^{A^H} COV_m^A)^{-1} COV_m^{A^H}$.

The transformation matrices 312 are stored in the memory module 250.

Similarly, the transformation matrix module 310 uses the m+1 covariance matrix of receiving signals of CPE B to produce m transformation matrices 314 for CPE B, denoted as $T^B$, based on the following equations:

$T_i^B = COV_{i+1}^B (COV_i^B)^{-1}$, where $i \in \{1, \ldots, m-1\}$, and $T_m^B = COV^B (COV_m^B)^{-1}$.

If $(COV_m^B)^{-1}$ does not exist the m-th transformation matrix $T_m^B$ is produced based on the following equation: $T_m^B = COV_{m+1}^B (COV_m^{B^H} COV_m^B)^{-1} COV_m^{B^H}$. The transformation matrices 314 are stored in the memory module 250.

The derivative spatial signature matrix module 320 calculates a set of n derivative spatial signature matrices 322 from the set of transformation matrices 312 of CPE A according to the following equation:

$R_i^A = T_i^A Cov^A$, where $i \in \{1, \ldots, n\}$ and $n \leq m$.

The last matrix in the set of the covariance matrices of receiving signals is $COV^A$. The set of derivative spatial signature matrices 322 is stored in the memory module 250.

The derivative spatial signature matrix module 320 calculates a set of n derivative spatial signature matrices 324 from the set of transformation matrices 314 of CPE B according to the following equation:

$R_i^B = T_i^B Cov^B$, where $i \in \{1, \ldots, n\}$ and $n \leq m$.

The last matrix in the set of the covariance matrices of receiving signals is $COV^B$. The set of derivative spatial signature matrices 324 is stored in the memory module 250. The number of derivative spatial signature matrices for each CPE is predetermined according to the requirements of the wireless communication network.

Using the derivative spatial signature matrices 324 of CPE B, the interference covariance matrix module 330 produces a covariance matrix of interference 332 of CPE A according to the following equation:

$$\sum_{i=1}^{n} R_i^B.$$

Similarly, the interference covariance matrix module 330 uses the derivative spatial signature matrices 322 of CPE A to produce a covariance matrix of interference 334 of CPE B according to the following equation:

$$\sum_{i=1}^{n} R_i^A.$$

The eigenvector module 340 generates the beamforming weighting vectors of CPEs A and B by using the covariance matrices of interference 332 and 334. A beamforming weighting vector 342 of CPE A, denoted as $W^A$, is generated using the following eigenvalue matrix:

$$\left[\frac{1}{m}\left(\sum_{i=1}^{m} R_i^B\right) + \sigma_n^2 I\right]^{-1}\left(\sum_{i=1}^{m} R_i^A\right).$$

$W^A$ is the eigenvector corresponding to the largest eigenvalue of the matrix. In the same fashion, a beamforming weighting vector 344, of CPE B, denoted as $W^B$, is generated using the following eigenvalue matrix:

$$\left[\frac{1}{m}\left(\sum_{i=1}^{m} R_i^A\right) + \sigma_n^2 I\right]^{-1}\left(\sum_{i=1}^{m} R_i^B\right).$$

$W^B$ is the eigenvector corresponding to the largest eigenvalue of the matrix.

The method disclosed in the present invention can reduce the noise caused by a CCI leakage by a significant level and is superior to existing methods. The method disclosed in the present invention increases the robustness of SDMA via nulling by creating an antenna beam pattern that has a wider nulling angle positioned toward the DOA of CCI.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A base transceiver station (BTS) equipped with a plurality of antennas, the BTS comprising:
a first matrix module receiving a plurality of signals from one or more customer premises equipments (CPEs) through the plurality of antennas and producing correspondingly a first plurality of covariance matrices representing the plurality of signals;
a second matrix module receiving the first plurality of covariance matrices and generating correspondingly a set of derivative spatial signature matrices representing the CPEs, respectively;
a third matrix module receiving the derivative spatial signature matrices and producing correspondingly a second plurality of covariance matrices representing interferences of the CPEs; and
an eigenvector module generating a plurality of beamforming vectors for the CPEs from the plurality of derivative spatial signature matrices and the second plurality of covariance matrices.

2. The BTS of claim 1 further comprising a memory module coupled to the first, second and third matrix modules and to the eigenvector module for storing and supplying the plurality of signals and the first and second plurality of covariance matrices.

3. The BTS of claim 1, wherein the first matrix module comprises:
a receiver module receiving the plurality of signals and forwarding the plurality of signals to the memory module; and
a covariance matrix module retrieving the plurality of signals from the memory module, producing the first plurality of covariance matrices and forwarding the first plurality of covariance matrices to the memory module.

4. The BTS of claim 1, wherein the second matrix module comprises:
a spatial signature module retrieving the first plurality of covariance matrices from the memory module and generating correspondingly a set of spatial signatures and forwarding the set of spatial signatures to the memory module; and
a derivative spatial signature matrix module retrieving the set of spatial signatures from the memory module and calculating correspondingly the set of derivative spatial signature matrices and forwarding the set of derivative spatial signature matrices to the memory module.

5. The BTS of claim 4, wherein the derivative spatial signature matrices are calculated based on the covariance matrix of receiving signals.

6. The BTS of claim 1, wherein the third matrix module produces one of the second plurality of covariance matrix for CPE k by retrieving one or more sets of derivative spatial signature matrices of the rest of the CPEs, sharing a communication channel, from the memory module and producing the covariance matrices of interference according to the following equation:

$$\sum_{j=1, j \neq k}^{L} \left(\frac{1}{s^j} \sum_{i=1}^{s^j} R_i^j R_i^{jH}\right),$$

where $R_i^j$ is a derivative spatial signature matrix of CPE j; $R_i^{jH}$ is the conjugate-transpose of $R_i^j$; L represents the number of CPEs sharing the communication channel; $s^j$ is the number of derivative spatial signature matrices of CPE j.

7. The BTS of claim 1, wherein the eigenvector module generates a beamforming weighting vector $W^k$ of CPE k using the following eigenvalue matrix:

$$\left[\sum_{j=1, j \neq k}^{L} \left(\frac{1}{s^j} \sum_{i=1}^{s^j} R_i^j R_i^{jH}\right) + \sigma_n^2 I\right]^{-1} \left(\sum_{i=1}^{s^k} R_i^k R_i^{kH}\right).$$

8. The BTS of claim 7, wherein $W^k$ is the eigenvector corresponding to the largest eigenvalue of the matrix.

9. A base transceiver station (BTS) equipped with a plurality of antennas, the BTS comprising:
a first matrix module receiving a plurality of signals from one or more customer premises equipments (CPEs) through the plurality of antennas and producing correspondingly a first plurality of covariance matrices representing the plurality of signals;

a second matrix module receiving the first plurality of covariance matrices and generating correspondingly a set of derivative spatial signature matrices representing the CPEs respectively, wherein the second matrix module further comprises:
  a transformation matrix module retrieving the first plurality of covariance matrices and generating correspondingly a set of transformation matrices, and
  a derivative spatial signature matrix module calculating correspondingly the set of derivative spatial signature matrices from the set of transformation matrices;
a third matrix module receiving the derivative spatial signature matrices and producing correspondingly a second plurality of covariance matrices representing interferences of the CPEs; and
an eigenvector module generating a plurality of beamforming vectors for the CPEs from the plurality of derivative spatial signature matrices and the second plurality of covariance matrices.

10. The BTS of claim 9 further comprising a memory module coupled to the first, second and third matrix modules and to the eigenvector module for storing and supplying the plurality of signals and the first and second plurality of covariance matrices.

11. The BTS of claim 9, wherein the first matrix module comprises:
  a receiver module receiving the plurality of signals and forwarding the plurality of signals to the memory module; and
  a covariance matrix module retrieving the plurality of signals from the memory module, producing the first plurality of covariance matrices and forwarding the first plurality of covariance matrices to the memory module.

12. The BTS of claim 9, wherein the second matrix module produces a set of transformation matrices of one or more CPEs from a set of covariance matrices of receiving signals based on the following equations:

$T_i = COV_{i+1}(COV_i)^{-1}$ and $T_m = COV(COV_m)^{-1}$, where $i \in \{1, \ldots, m-1\}$;

$T_i$ is the i-th element of the set of transformation matrices; $COV_i$ is the i-th element; COV is the last element of the set of covariance matrices of receiving signals.

13. The BTS of claim 9, wherein the derivative spatial signature matrix module calculates a set of derivative spatial signature matrices according to the following equation:

$V_i = T_i Cov$, where $i \in \{1, \ldots, n\}$ and $n \leq m$;

$T_i$ is the i-th element of the set of transformation matrices; COV is the last element of the set of covariance matrices of receiving signals.

14. The BTS of claim 9, wherein the third matrix module produces the covariance matrices of interference for CPE k according to the following equation:

$$\sum_{j=1, j \neq k}^{L} \sum_{i=1}^{n} R_i^j,$$

where $i \in \{1, \ldots, n\}$, $R_i^j$ is the i-th element of the set of derivative spatial signature matrices of CPE j and L represents the number of CPEs sharing the communication channel.

15. The BTS of claim 9, wherein the eigenvector module generates a beamforming weighting vector $W^k$ of CPE k using the following eigenvalue matrix:

$$\left[ \sum_{j=1, j \neq k}^{L} \frac{1}{m} \left( \sum_{i=1}^{n} R_i^j \right) + \sigma_n^2 I \right]^{-1} \left( \sum_{i=1}^{m} R_i^k \right),$$

where $R_i^j$ is the i-th element of the set of derivative spatial signature matrices of CPE j, and L represents the number of CPEs sharing the communication channel.

16. A method to generate beamforming weighting vectors for spatial division multiple access (SDMA) via nulling, the method comprising:
  generating a first plurality of covariance matrices from a plurality of signals of one or more customer premises equipments (CPEs) received by a plurality of antennas;
  generating one or more sets of derivative spatial signature matrices of the CPEs from the first plurality of covariance matrices;
  producing a second plurality of covariance matrices representing interferences of the CPEs from one or more sets of derivative spatial signature matrices; and
  generating a plurality of beamforming vectors for the CPEs, respectively from the plurality of derivative spatial signature matrices and the second plurality of covariance matrix.

17. The method of claim 16, wherein the generating one or more sets of derivative spatial signature matrices comprises:
  calculating one or more sets of spatial signatures of the CPEs from the first plurality of covariance matrix; and
  generating the one or more sets of derivative spatial signature matrices of one or more CPEs from the one or more sets of spatial signatures.

18. The method of claim 16, wherein the second plurality of covariance matrices are produced according to the following equation:

$$\sum_{j=1, j \neq k}^{L} \left( \frac{1}{s^j} \sum_{i=1}^{s^j} R_i^j R_i^{jH} \right),$$

where $R_i^j$ is a covariance matrix of receiving signals of CPE j; $R_i^{jH}$ is the conjugate-transpose of $R_i^j$; L represents the number of CPEs sharing a communication channel; $s^j$ is the number of derivative spatial signature matrices of CPE j.

19. The method of claim 16, wherein the plurality of beamforming weighting vectors are generated using the following eigenvalue matrix:

$$\left( \sum_{j=1, j \neq k}^{L} \left( \frac{1}{s^j} \sum_{i=1}^{s^j} R_i^j R_i^{jH} \right) + \sigma_n^2 I \right)^{-1} \left( \sum_{i=1}^{s^k} R_i^k R_i^{kH} \right),$$

wherein k represents one of the CPEs.

20. The method of claim 19, wherein each of the plurality of beamforming weighting vectors is an eigenvector corresponding to the largest eigenvalue of the equation.

* * * * *